3,405,079
REACTION PRODUCT OF AN ALKYLATED AMINO RESIN AND AN AROMATIC HYDROCARBON-FORMALDEHYDE RESIN
Ching Yun Huang, Minoo-shi, Kazuo Ueno, Ibaraki-shi, Shinji Kawamura, Amagasaki-shi, Hisanori Tanabe, Ibaraki-shi, and Keizo Masawaki, Osaka, Japan, assignors to Japan Gas-Chemical Company, Inc., Tokyo, Japan, a corporation of Japan
No Drawing. Filed Mar. 25, 1966, Ser. No. 537,315
Claims priority, application Japan, Mar. 27, 1965, 40/17,664
12 Claims. (Cl. 260—3)

ABSTRACT OF THE DISCLOSURE

An alkylated amino resin modified with an aromatic hydrocarbonformaldehyde resin is used to improve the properties of rubber, said modified alkylated amino resin being a viscous liquid or solid resin at room temperature, and prepared by heating an alkylated amino resin with an aromatic hydrocarbon-formaldehyde resin in the presence of an acidic catalyst to react them. Said modified resin works as plasticizer for natural and synthetic rubbers, and hence can be well dispersed thereinto, and thus, the modified resin and the rubber can easily and smoothly be mixed with each other. Further, said modified resin can remarkably reinforce a vulcanized rubber when incorporated thereinto.

---

This invention relates to a method for improving the properties of rubber and a rubber so improved. More particularly incorporating it relates to a method for improving the properties of rubber by mixing therewith an amino resin modified with an aromatic hydrocarbon formaldehyde resin by way of milling intimately to mutually dispersed state, followed by curing for the purpose of reinforcement and a rubber so improved.

For improving the properties of rubber, there has been prevailing hitherto a method which resorts to mixing a thermosetting resin such as phenol, urea, aniline, epoxy or melamine resin with a rubber for the purpose of reinforcement. Of such thermosetting resins, since amino resins such as urea resin and melamine resin are water soluble, it is mixed with rubber latex, coagulated and co-precipitated, to give reinforcement to rubber. But since amino resins have inherently poor compatibility with rubber, even if they are added to ordinary massive rubber and mixing them with a mechanical means such as rolls or a Banbury mixer, they are not dispersed sufficiently. Moreover since they are liable to be heat-cured by nature, they are sometimes caused to be cured during milling time. Accordingly they have not found their way in reinforcing rubbers to a practically satisfactory extent.

An object of the present invention is to provide a method for producing a cured rubber having superior reinforced properties. Another object of the present invention is to provide a cured rubber having superior reinforced properties. These and other specific objects and advantages of the invention will become apparent from the following description.

It has been now discovered such a method and such a rubber by the present inventors by incorporating an amino resin modified with an aromatic hydrocarbon formaldehyde resin into rubber intimately to mutually dispersed state with mechanical means such as rubber rolls, Banbury mixer or the like.

This excellent effect is supposed to be obtained because an amino resin modified with an aromatic hydrocarbon formaldehyde is composed of an aromatic hydrocarbon and an amino resin, of which the aromatic hydrocarbon, a solvent to rubber, remarkably promotes its dispersing property and compatibility with rubber, while, on the other hand, retarding the cure rate of the amino resin, so that the vulcanizing conditions of rubber accord with curing condition of said resin.

The amino resin modified with aromatic hydrocarbon formaldehyde resin which is used in the present invention for improving the properties of rubbers is a viscous liquid or solid resin at room temperature prepared by heating to react an alkylated compound of N-methylol amino resin with an aromatic hydrocarbon formaldehyde resin in the presence of an acid catalyst.

As the alkylated compound of an N-methylol amino resin, there are included the reaction products of amino compounds such as urea, thiourea, melamine, dicyandiamide, guanidine and benzoguanamine, each alone or their mixture, with such a formaldehyde as formalin or paraformaldehyde and a lower aliphatic alcohol such as methanol, ethanol, propanol or butanol. They can be produced by the method of obtaining the alkylated compound by reacting the above-mentioned three raw materials on heating simultaneously in the presence of an acid catalyst or the two-step method that an N-methylol amino resin such as urea formaldehyde resin, melamine formaldehyde resin, dicyandiamide formaldehyde resin, benzoguanamine formaldehyde resin or urea melamine formaldehyde co-condensation resin is produced in advance and then an alkylated compound is obtained by reacting an aliphatic alcohol having 1–4 carbon atoms with said amino resin by heating in the presence of an acid catalyst. As the acid catalyst, a mineral acid, Lewis acid, organic sulfonic acid or organic carboxylic acid is used. Further, the aromatic hydrocarbon formaldehyde resin which is used for the abovementioned modification reaction is a viscous liquid or solid resin containing 5–15% of oxygen which is obtained by reacting an aromatic hydrocarbon such as benzene, toluene, xylene, mesitylene, durene, naphthalene or methyl naphthalene with such formaldehyde as formalin or paraformaldehyde on heating in the presence of an acid catalyst.

As it is well-known, each of those resins has an ether or acetal group between its aromatic nuclei and a methylol group at its terminal, showing the reactivity of an alcohol when it is heated in the presence of an acid catalyst. When it is heated together with the abovementioned alkylated compound of N-methylol, it carries out, accordingly, an ether exchange reaction easily with a lower aliphatic alcohol combined already with it and it is presumed as a result, that the alkoxy group of the alkylated amino resin is exchanged with an aromatic nucleus. The amount of an aromatic hydrocarbon formaldehyde resin used for the modification is preferably 30–200 parts to 100 parts by weight of an etherificated amino resin.

The method of the present invention for improving the properties of rubber consists in adding an amino resin modified by the above-mentioned method, a vulcanizing agent and an assistant generally used in rubber industry such as sulfur, vulcanizing accelerators and lubricants, and, if necessary, fillers such as carbon black and white carbon and the like to rubber, mixing them with rolls or Banbury mixer and vulcanizing it on heating. On milling them with rolls, the above-mentioned modified amino resin gives suitable tackiness and plasticity, that is, excellent processability to rubber.

The amino resins like methylol compound of melamine and that of urea, generally used heretofore, are very sensitive to heat and therefore they are cured partly on mixing them with rubber even at a mixing temperature with rolls or Banbury. Further they are poor compatible with rubber, so they work only as the fillers of rubber, not reinforcing it at all. But since the modified amino resin of the present invention is cured at comparatively a high temperature and in a long time e.g. at 150° C. and in 10 to 30 minutes, it is not cured during the time of mixing with rubber and works as a plasticizer of rubber, presenting good dispersibility and processability, while at the same time being cured during the vulcanizing step, affording thus remarkable reinforcement effect upon rubbers.

Rubbers which can be used in the present invention are sulfur-curable natural or synthetic rubber such as natural rubber (NR), styrene-butadiene rubber (SBR), acrylonitrile-butadiene rubber (NBR), chloroprene rubber (CR), isobutylene isoprene rubber (IIR), butadiene rubber (BR) or isoprene rubber (IR), each alone or a mixture of two or more of them. The modified amino resin used for improving the properties of rubber, as it has been mentioned above, are alkylated amino resins such as alkylated urea formaldehyde, thio-urea formaldehyde resin, melamine formaldehyde resin, dicyandiamide formaldehyde resin, guanidine formaldehyde resin and benzoguanamine formaldehyde resin or alkylated co-condensed amino resins such as urea melamine formaldehyde resin, urea, thio-urea formaldehyde resin, melamine benzoguanamine formaldehyde resin, and melamine dicyandiamide formaldehyde resin, all modified with an aromatic hydrocarbon formaldehyde resin, respectively, each alone or a mixture of two or more of them. Of those modified resins, one based on melamine formaldehyde resin, for example, gives to rubber high tensile strength as well as high hardness and high modulus but another based on urea formaldehyde gives comparatively low hardness, low modulus and high tensile strength.

Accordingly, those modified resins, which are based on a co-condensed material such as urea melamine formaldehyde resin have significant meaning in obtaining intermediate properties of two constituent resins. The using amount of each of those modified amino resins varies with the purpose of improvement but is preferably to be 20 to 50 weight parts per 100 weight parts of rubber, and for the purpose of improving hardness and modulus, it is preferable to be 20 to 100 weight parts of rubber.

The effect of a vulcanized rubber by the present invention in the improvement of the properties of rubber is exhibited especially in the case of SBR. As a conventional method for improving the properties of SBR, one of phenol or melamine resins is milled with rubber before its vulcanization but by this method, the hardness and modulus of rubber are improved relatively well but its tensile strength is not improved so much and therefore the method is not considered being of practical use. According to the present method for improving the properties of rubber, such a substantial reinforcing effect can be given to rubber as has never been achieved by use of the conventional resins.

For example, the vulcanized rubber of which the properties have been improved by using 10 weight parts of the resin per 100 weight parts of rubber presents a tensile strength of about 100 kg./cm. (about three times that of a rubber not improved by this way) and further when 20–30 weight parts of the resin is used, the tensile strength of the resultant improved rubber reaches 150 kg./cm. Further as the using amount of the resin is increased, the hardness and modulus of the vulcanized rubber rise.

In addition to the above-mentioned excellent effect in reinforcement, the improved rubber by the method of the present invention is good in resistance to abrasion and heat and further characterized in generating less internal heat than an ordinary rubber reinforced by carbon.

Further, as to the appearance, the vulcanized rubber is scarcely coloured, so a rubber which can be coloured freely can be obtained. This is a remarkable advantage in practical application.

Furthermore, the method of the present invention is very effective to a rubber of comparatively high polarity, such as NBR or CR as well as SBR or NR of a low polarity.

For example, when 25 weight parts of the resin are added to 100 weight parts of NBR, the resultant improved vulcanized rubber presents a tensile strength of about 160 kg./cm.$^2$. The rubber having the above-mentioned excellent properties can meet the demand of a new age in such applications as shoe soles, tyres for high speed rolling stocks, shock-proof rubber, rolls, oil-seal, cable coating etc.

For a clear understanding of the present invention, the following specific examples are given. These examples are intended to be merely illustrative of the invention and not in limitation thereof. Parts by weight are used throughout.

Example 1

A mixture of 100 parts of dimethylol melamine and 300 parts of butanol of which the pH was made to become 5.0 with p-toluene sulfonic acid, was reacted together at 90° C. for 30 minutes to obtain a transparent solution of butylated melamine resin in butanol. Next 50 parts of xylene formaldehyde resin was added. Then the reaction was proceeded on heating at the boiling point of the reaction mixture while excessive butanol was being eliminated. Finally butanol was eliminated completely. As a result, a semi-solid resin, having a low softening point at room temperature, was obtained.

25 parts of the resin, 100 parts of SBR, 3 parts of sulfur, 1 part of a vulcanizing accelerator CZ (cyclohexylbenzothiazole sulfenamide), 3 parts of zinc white and 1 part of stearic acid were mixed together with rolls at a surface temperature of 60° C. and then the rubber stock was vulcanized at 141° C. for 40 minutes. The physical properties of the rubber thus obtained were measured. The result was as shown in the following.

| | Vulcanized rubber by the method of the present invention | Vulcanized rubber with commercially available melamine resin added to it | Vulcanized rubber without adding a resin to it |
|---|---|---|---|
| Tensile strength (kg./cm.$^2$) | 152 | 33 | 23 |
| Elongation (percent) | 740 | 350 | 510 |
| Shore hardness | 62 | 57 | 37 |
| 300% modulus (kg./cm.$^2$) | 40 | 28 | 14 |

Example 2

A mixture of 100 parts of dimethylol urea and 300 parts of butanol of which the pH was made to become 5.0 with oxalic acid was heated at 100° C. for 1 hour. Next 50 parts of toluene formaldehyde resin was added. The reaction was continued to proceed at the boiling point of the reaction mixture while butanol was being recovered. Finally when butanol was eliminated completely, a white butter-like urea resin modified with toluene resin was obtained. Sulfur, a vulcanizing accelerator CZ (cyclohexyl benzothiazole sulfamide), zinc white and stearic acid, each in the same amount as in Example 1, were mixed with 25 parts of the said modified resin and 100 parts of SBR on rolls and then the resultant rubber stock was vulcanized at 141° C. for 40 minutes. The rubber thus obtained presented the following physical properties.

Tensile strength (kg./cm.$^2$) _____ 131
Elongation (percent) _____ 700
Shore Hardness _____ 47
300% modulus (kg./cm.$^2$) _____ 27

Example 3

A mixture of 100 parts of benzoguanamine, 90 parts of 37% formalin and 300 pats of butanol was reacted at a temperature ranging from 90° to 100° C. while it is being dehydrated.

Next 1 part of concentrated hydrochloric acid and 50 parts of xylene formaldehyde resin were added. The reaction was continued to proceed for 2 hours while the reaction mixture was being dehydrated further, before excessive butanol was eliminated. Then a light yellow transparent solid resin having a softening point of 51° C. was obtained. Sulfur, a vulcanizing accelerator CZ, zinc white and stearic acid each in the same amount as in Example 1 were mixed with 25 parts of the said resin and 100 parts of SBR on rolls. The resultant rubber stock was vulcanized at 141° C. for 40 minutes. The rubber thus obtained presented the following physical properties.

Tensile strength (kg./cm.$^2$) _____ 95
Elongation (percent) _____ 645
Shore Hardness _____ 52
300% modulus (kg./cm.$^2$) _____ 20

Example 4

25 parts of the modified resin used in Example 3, 100 parts of NBR (Hycar 1041), 2 parts of sulfur, 1 part of a vulcanizing accelerator CZ, 5 parts of zinc white and 1 part of stearic acid were mixed together on rolls and vulcanized at 148° C. for 30 minutes. The resultant rubber stock presented the following physical properties.

|  | Vulcanized rubber by the present invention | Vulcanized rubber without resin added |
|---|---|---|
| Tensile strength (kg./cm.$^2$) | 157 | 74 |
| Elongation (percent) | 700 | 640 |
| Shore Hardness | 52 | 44 |
| 300% modulus (kg./cm.$^2$) | 53 | 15 |
| Tear strength (kg./cm.$^2$) | 29 | 10 |

Example 5

A mixture of 100 parts of urea, 100 parts of melamine, 150 parts of 85% paraformaldehyde and 400 parts of butanol was heated for 90 minutes with stirring. Excessive butanol was eliminated from the transparent reaction solution. Next 120 parts of toluene formaldehyde resin and 0.5 part of p-toluene sulfonic acid were added. The reaction mixture was reacted at 100° C. for 30 minutes. As a result a slightly intransparent semi-solid resin was obtained. 30 parts of the modified resin, 100 parts of SBR, 3 parts of sulfur, 1 part of a vulcanizing accelerator CZ, 3 parts of zinc white and 1 part of stearic acid were mixed together on rolls. The resultant rubber stock was vulcanized at 141° C. for 60 minutes. The rubber thus obtained presented the following physical properties.

Tensile strength (kg./cm.$^2$) _____ 140
Elongation (percent) _____ 630
Shore Hardness _____ 55
300% modulus (kg./cm.$^2$) _____ 32

Example 6

A mixture of 100 parts of dimethylol urea and 500 parts of methanol of which the pH was made to become 5.0 with m-xylene sulfonic acid was reacted under reflux for 30 minutes. Next 60 parts of naphthalene formaldehyde resin and 200 parts of toluene were added. The solvent was recovered from the reaction mixture with stirring, until a white solid resin having a low softening point was obtained. A mixture of 35 parts of the resin, 1 part of a vulcanizing accelerator CZ, 3 parts of zinc white and 1 part of stearic acid was mixed on rolls and vulcanized at 140° C. for 40 minutes. The resultant rubber stock presented a tensile strength of 105 kg./cm.$^2$ and an elongation of 710%.

Example 7

A mixture of 400 parts of a butanol solution of butylated melamine resin obtained by the same method as in Example 1 using tri-methylol melamine and 70 parts of naphthalene formaldehyde resin (containing oxygen by 7.5%) was reacted at less than 115° C. at reduced pressure while butanol was being eliminated. Then a light yellow resin having a softening point of 40°–45° C. was obtained. 100 parts of SBR, 30 parts of the said resin, 3 parts of sulfur, 1.5 parts of a vulcanizing accelerator DM (dibenzothiazyl disulfide), 5 parts of zinc white and 1 part of stearic acid mixed on rolls at 60°–65° C. for 15 minutes. The resultant rubber stock was vulcanized at 148° C. for 30 minutes. The vulcanized rubber presented the following physical properties.

|  | Vulcanized rubber by the present invention | Vulcanized rubber without resin added |
|---|---|---|
| Tensile strength (kg./cm.$^2$) | 135 | 23 |
| Elongation (percent) | 650 | 510 |
| Shore Hardness | 64 | 37 |
| 300% modulus (kg./cm.$^2$) | 39 | 14 |

Example 8

A mixture of 100 parts of monomethylol dicyandiamide and 300 parts of butanol of which the pH was made to become 4.5 with formic acid was heated on a water bath for 1 hour. Next 70 parts of α-methyl naphthalene formaldehyde resin (containing oxygen by 6.9 percent) was added. The reaction mixture was reacted at less than 115° C. at a reduced pressure while butanol was being eliminated. As a result, a colourless resin having a low softening point was obtained. 100 parts of 97% 1,4-cis-polybutadiene, 25 parts of the said α-methyl naphthalene dicyandiamide resin, 5 parts of zinc white, 2 parts of sulfur, 1 part of a vulcanizing accelerator DM and 1 part of phenyl-β-naphthylamine were mixed at 148° C. for 45 minutes. The resultant rubber stock was vulcanized at 148° C. for 45 minutes. The vulcanized rubber presented the following physical properties.

|  | Vulcanized rubber by the present invention | Vulcanized rubber without resin added |
|---|---|---|
| Tensile strength (kg./cm.$^2$) | 160 | 62 |
| Elongation (percent) | 900 | 800 |
| Shore Hardness | 54 | 43 |
| 300% modulus (kg./cm.$^2$) | 48 | 13 |
| Tear strength (kg./cm.$^2$) | 29 | 10 |

What is claimed is:

1. A method for improving the properties of a rubber selected from the group consisting of natural rubber, styrene-butadiene rubber, acrylonitrile-butadiene rubber, chloroprene rubber, isobutylene-isoprene rubber, butadiene rubber and isoprene rubber, which comprises mixing the said rubber intimately to a mutually dispersed state, with 20 to 100 parts by weight per 100 parts by weight of the rubber of at least one modified alkylated amino resin produced by reacting (1) at least one amino compound selected from the group consisting of urea, thiourea, melamine, dicyandiamide, quanidine, benzoquanamine and mixtures thereof, (2) an aldehyde selected from the group consisting of formaldehyde and paraformaldehyde, and (3) an aliphatic alcohol having 1 to 4 carbon atoms, on heating in the presence of an acidic catalyst, reacting the alkylated amino resin by heating with 30 to 200 parts by weight per 100 parts by weight of the resin of an aromatic hydrocarbon formaldehyde resin in the presence of an acidic catalyst and said aromatic hydrocarbon formaldehyde resin being produced by heating an aromatic hydrocarbon selected from the group consisting of benzene, toluene, xylene, mesitylene, durene, naphthalene and methyl naphthalene, with an aldehyde selected from the group consisting of formaldehyde and paraformaldehyde in the presence of an acidic catalyst so as to give an oxygen content ranging from 5 to 15 percent by weight.

2. A method according to claim 1, wherein acidic catalysts used in all steps are selected from the group consisting of inorganic acids, Lewis acids, organic sulfonic acids and organic carboxylic acid.

3. The process of claim 1 wherein said alcohol is reacted with the reaction product of said amino compound and said aldehyde.

4. A reinforced rubber comprising a rubber selected from the group consisting of natural rubber, styrene butadiene rubber, acrylonitrile butadiene rubber, chloroprene rubber, butyl rubber, butadiene rubber and isoprene rubber and 20 to 100 parts by weight (relative to 100 parts by weight of rubber) of at least one kind of modified alkylated N-methylol amino resin which is produced by reacting at least one amino compound selected from the group consisting of urea, thiourea, melamine, dicyandiamide, guanidine, benzoguanamine and a mixture thereof, a formaldehyde affording member selected from the group consisting of formaldehyde and paraformaldehyde, and a lower aliphatic alcohol having less than 4 carbon atoms on heating in the presence of an acidic catalyst, the said modification of alkylated N-methylol amino resin being carried out by heating it with 30 to 200 parts by weight (relative to 100 parts by weight of alkylated N-methylol amino resin) of an aromatic hydrocarbon formaldehyde resin in the presence of an acidic catalyst and said aromatic hydrocarbon formaldehyde resin being produced by heating an aromatic hydrocarbon selected from the group consisting of benzene, toluene, xylene, mesitylene, durene, naphthalene and methyl naphthalene with a formaldehyde affording member selected from the group consisting of formaldehyde and paraformaldehyde in the presence of an acidic catalyst so as to give an oxygen content ranging from 5 to 15 percent by weight.

5. The reinforced rubber of claim 4 wherein said low aliphatic alcohol is reacted with the reaction product of said amino compound and said aldehyde.

6. The reinforced rubber of claim 4 wherein said rubber is a styrene-butadiene rubber, said alkylated N-methylol amino resin is a butylated dimethylol melamine resin and said aromatic hydrocarbon formaldehyde resin is a xylene formaldehyde resin.

7. The reinforced rubber of claim 4 wherein said rubber is a styrene-butadiene rubber, said alkylated N-methylol amino resin is a butylated dimethylol urea resin and said aromatic hydrocarbon formaldehyde resin is a toluene-formaldehyde resin.

8. The reinforced rubber of claim 4 wherein said rubber is a styrene-butadiene rubber, said alkylated N-methylol amino resin is a butylated benzoguanamine-formaldehyde resin and said aromatic hydrocarbon formaldehyde resin is a xylene-formaldehyde resin.

9. The reinforced rubber of claim 4 wherein said rubber is a styrene-butadiene rubber, said alkylated N-methylol amino resin is a butylated urea melamine formaldehyde resin and said aromatic hydrocarbon formaldehyde resin is a toluene formaldehyde resin.

10. The reinforced rubber of claim 4 wherein said rubber is an acrylonitrile-butadiene rubber, said alkylated N-methylol amino resin is a butylated benzoguanamine formaldehyde resin and said aromatic hydrocarbon formaldehyde resin is a xylene formaldehyde resin.

11. The reinforced rubber of claim 4 wherein said rubber is a styrene butadiene rubber, said alkylated N-methylol amino resin is a butylated trimethylol melamine resin and said aromatic hydrocarbon formaldehyde resin is a naphthalene formaldehyde resin.

12. The reinforced rubber of claim 4 wherein said rubber is a butadiene rubber, said alkylated N-methylol amino resin is a butylated methylol dicyandimide resin and said aromatic hydrocarbon formaldehyde resin is an $\alpha$-methyl naphthalene formaldehyde resin.

References Cited

UNITED STATES PATENTS 2,886,542   5/1959   Kremer _____ 260—852
3,165,558   1/1965   Imoto _____ 260—823

FOREIGN PATENTS 478,703   1/1938   Great Britain.

MURRAY TILLMAN, *Primary Examiner.*

M. J. TULLY, *Assistant Examiner.*